United States Patent Office

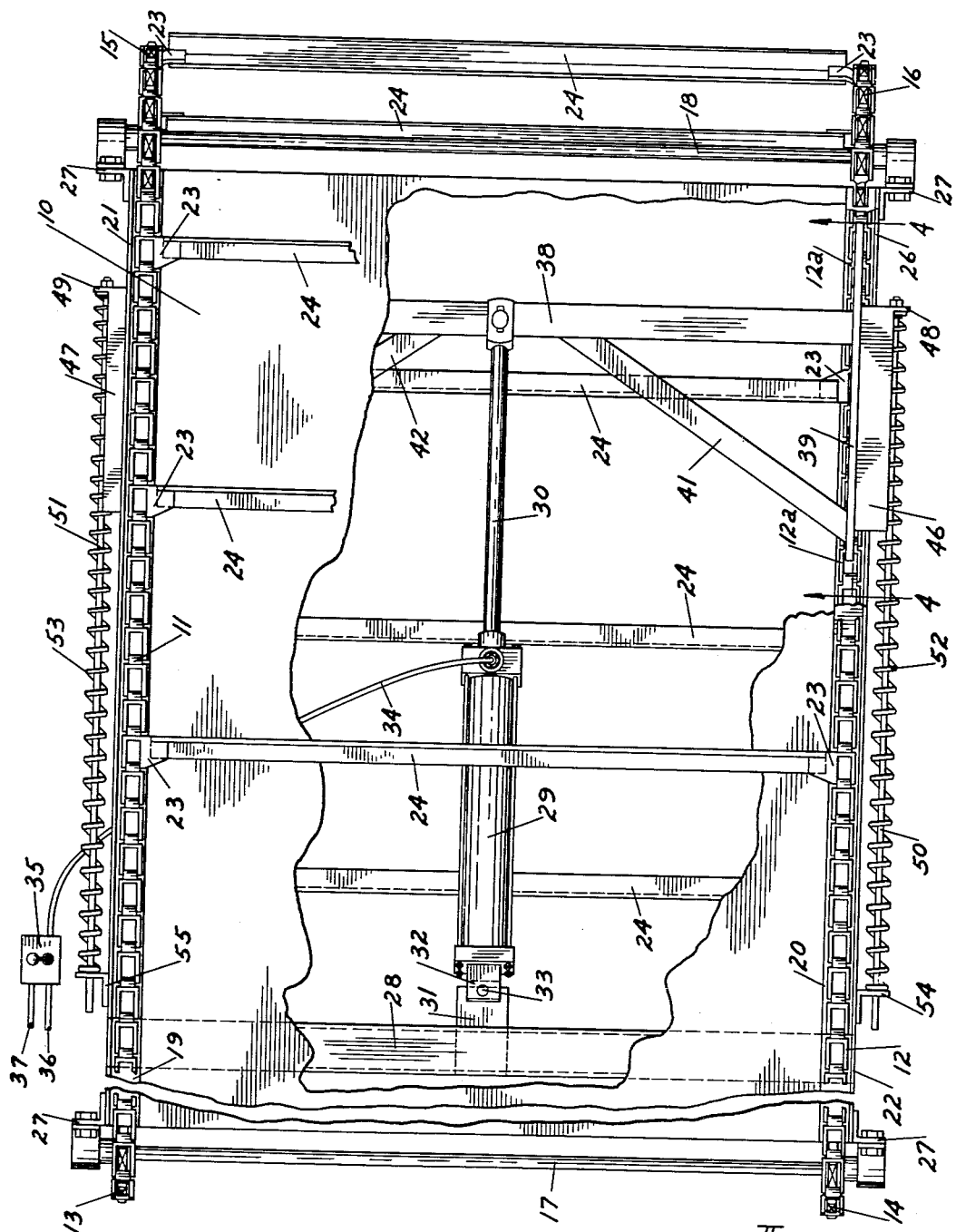

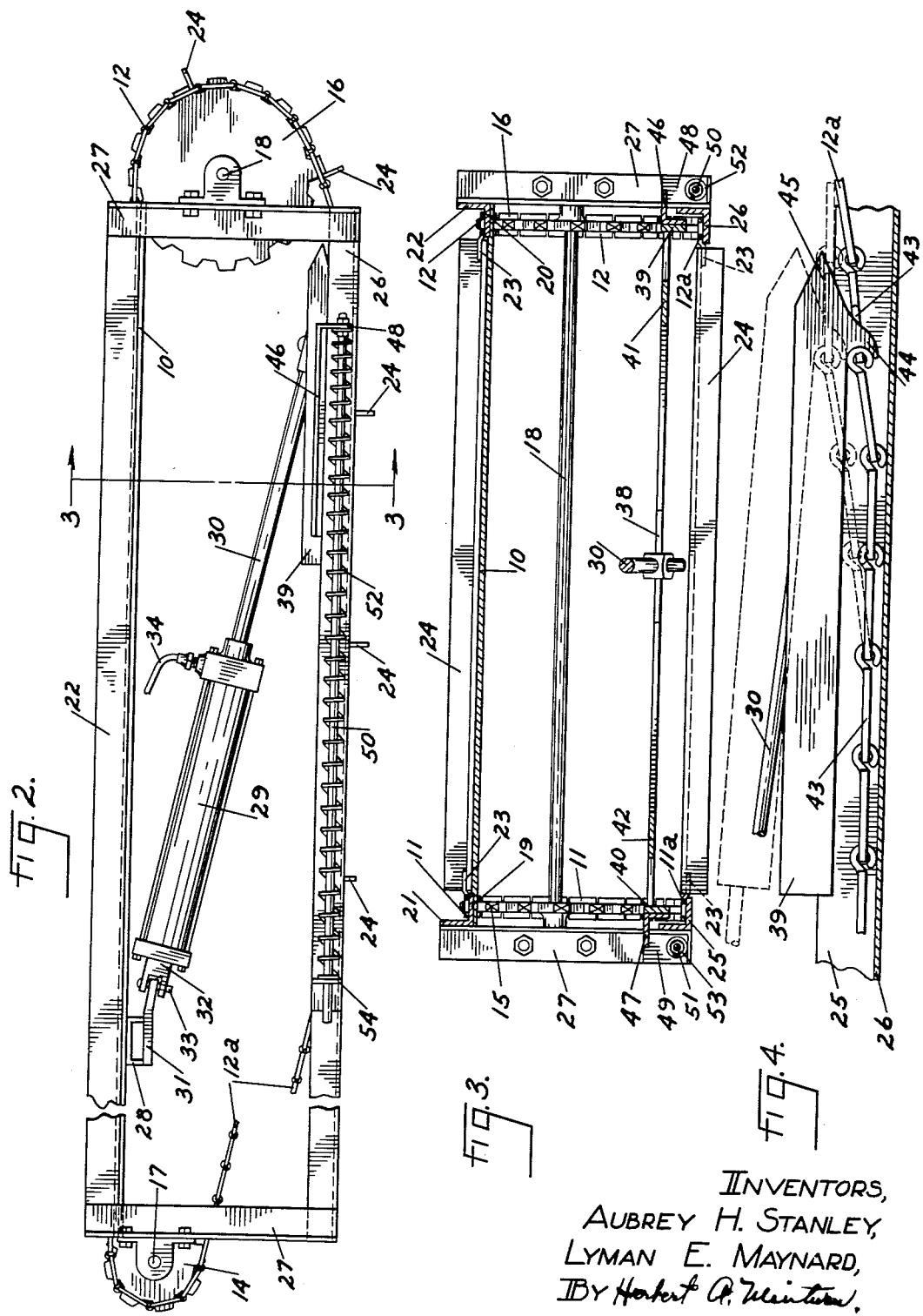

2,720,963
Patented Oct. 18, 1955

2,720,963

DRIVE FOR UNLOADING CONVEYOR

Aubrey H. Stanley, Clayton, and Lyman E. Maynard, Plainfield, Ind.

Application July 18, 1952, Serial No. 299,662

8 Claims. (Cl. 198—135)

This invention relates to a construction having for its primary purpose the progressive unloading of grain, grass and hay forage and the like, and in fact various materials, particularly such as may be carried about in vehicles and wagons in farming practice. The construction may be incorporated in the usual manure spreader.

In general the invention embodies the combination of a floor or platform over which transverse, spaced apart drag links may be intermittently moved toward an unloading zone by use of the customarily employed hydraulic power cylinder, in which combination the cylinder will operate a structure free to travel over an operating chain in one direction and to engage that chain in the unloading travel direction thereof.

The primary purpose of the invention is to provide an exceedingly simple construction which may be applied to existing vehicle structures as well as being incorporated in such structures in their initial manufacturing set up. A further important object of the invention is to provide a hydraulic means of operation to eliminate the heretofore cams and ratchets and star wheels and the like.

In the present day mechanization of farm operations there is now commonly available a hydraulic power unit which is operated from a hydraulic pump incorporated on the usual farm tractor. It is a further object of the invention to take advantage of this situation whereby the hydraulic unit may be quickly applied to the unloading unit without any change in the hydraulic unit itself, all in that manner whereby the hydraulic unit may be quickly attached and detached from the unloading mechanism. Furthermore, by use of the hydraulic power unit, a yielding, somewhat elastic pressure is exerted through that unit to the actual unloading operating mechanism as opposed to a positive chain drive over sprockets.

These and many other objects and advantages of the invention will become apparent to those versed in the art in the following description of one particular form of the invention as illustrated in the accompanying drawings, in which Fig. 1 is a fragmentary top plan view of the structure embodying the invention;

Fig. 2 is a view in side elevation;

Fig. 3 is a view in vertical transverse section on the line 3—3 in Fig. 2; and

Fig. 4 is a detail on an enlarged scale in section on the line 4—4 in Fig. 1 of the hydraulically driven structure for engaging and disengaging an operating chain.

In the drawings, the invention is illustrated apart from any vehicle, in order to simplify the disclosure. In any event, there will be a floor or platform 10 which will normally support the load to be unloaded whether or not that platform 10 is incorporated as the floor of a wagon, a manure spreader, or any other device to be unloaded. Side boards (not shown) will of course be employed to confine the load over the platform 10.

There are a pair of endless chains 11 and 12 carried over the outer marginal side portions of the platform 10 and around thereunder, by being passed around a relatively front sprocket 13 on the one side and 14 on the other side, and around the respective rear sprockets 15 and 16. These respective sprockets are mounted on the ends of the front shaft 17 and the rear shaft 18. The axes of these two shafts 17 and 18 are located vertically to have the top flights of the chains 11 and 12 travel from the respective front and rear sprockets in contact with the platform 10 to leave and arrive on those sprockets in substantially tangential relations. The rear sprockets 15 and 16 are preferably made to have larger diameters, one having the same diameter as the other, in order to lower the lower flight of these chains 11 and 12 particularly adjacent these sprockets 15 and 16, so as to secure ample working space between the upper and lower flights towards the rear under side zone of the platform 10.

In the specific structure herein shown by way of illustration only and not as a limitation of the invention, the top flights of the chains 11 and 12 travel on the horizontally disposed legs 19 and 20 of supporting angle irons 21 and 22, Fig. 3, to which angle irons the platform 10 is attached for support. This structure may of course vary in specific applications.

The chains 11 and 12 will carry at regularly spaced intervals therealong special lengths 23 which extend laterally from the chains over the platform 10 as means to which transverse drag bars 24 may be attached and carried long by the two chains. By so interconnecting the ends of the bars 24, these bars may slide directly over the top face of the platform 10. The chains 11 and 12 will be so positioned around their respective sockets that the special lengths 23 will be opposite one another across the platform 10 so as to dispose the drag lengths 24 thereacross substantially at right angles to the edges of the platform.

Below the platform 10 there is positioned a pair of angle irons 25 and 26 herein shown as being supported by the legs 27 at the front and rear ends of the platform 10, to position the angle irons 25 and 26 to have the lower flights 11a and 12a of the chains 11 and 12 ride along the inturned legs of those angle irons as the lower flights leave the rear sprockets 15 and 16. The drag bars 24 will be extended between those angle irons 25 and 26, Fig. 3.

A cross frame member 28 is secured across the under side of the platform 10 forwardly of the sprockets 15 and 16 a sufficient distance to permit a hydraulic cylinder 29 to be rockably connected thereto and extend rearwardly and downwardly to have its piston rod 30 extended its full length ahead of the sprockets 15 and 16, Fig. 2. In the form herein shown, the frame member 28 is a channel iron, centrally of which is fixed a bracket 31 to which the cylinder 29 is rockably attached through the yoke 32 by means of the connecting pin 33. Since the construction of the cylinder 29 and its internal piston follows the standard construction well known to those versed in the art, the details thereof are not herein shown. From the internal piston, however, there extends the piston rod 30 to travel in and out of the cylinder 29 in the usual manner by the application of pressure through a fluid introduced into the rear end of the cylinder 29 through a hose 34 leading from a suitable control valve 35 by which a flow line 36 and a discharge line 37 may be selectively interconnected with the hose 34. When pressure is applied by forcing fluid through the line 34 into the cylinder 29, the rod 30 retracts to within the cylinder 29 a given distance, and when the piston rod 30 travels outwardly from the cylinder 29, the fluid is being exhausted through the line or hose 34.

The outer end of the piston rod 30 is rockably interconnected to the cross bar 38 of a frame which is composed of two outer side chain hook members 39 and 40, these hook members 39 and 40 being positioned by the outer ends of the members 38 to be directly over the lower chain flights 11a and 12a, Fig. 3. Further, for the sake of rigidity, the rear ends of these members 39 and 40 are preferably engaged by the outer ends of diagonally positioned brace members 41 and 42 extending inwardly and rearwardly therefrom to be secured to a central zone of the member 38.

The members 39 and 40 are generally rectilinear and have lengths to extends along and over a plurality of links 43 of the chains 11 and 12 in each instance. From the rearward under sides of these members 39 and 40 there is a downwardly and forwardly turned hook 44 in each instance. The hook has a transverse width such that it may drop down through any link 43, the links 43 being herein shown as the commonly employed pressed steel links. The hook 44 in each instance is positioned so that there is a rearwardly extending pointed end 45 in each instance of the members 39 and 40, this pointed end being at a distance from the extreme rear end of the hook 44 greater than the length of the chain link 43. From the under side of the hook 44, the members 39 and 40 in each instance are sloped upwardly to the pointed end 45 so that as the members 39 and 40 may be pushed rearwardly over the chains, the hook 44 may ride over the links without the pointed end 45 engaging into any of the openings therethrough.

On the outer respective sides of the members 39 and 40, there is provided respectively an outwardly extending plates 46 and 47 extending over the top sides of the angles 25 and 26. These plates 46 and 47 have downturned brackets 48 and 49 secured thereto to extend downwardly along the outer sides of the angle irons 25 and 26, and receive therethrough respectively rods 50 and 51 around which are carried coiled springs 52 and 53.

The rear ends of these rods pass slidingly through brackets 54 and 55 secured to the outer sides of the angle irons 25 and 26 at distances forwardly of the rear end of the platform 10 exceeding at least the travel of the piston rod 30. These rods 50 and 51 are secured by their rear ends to the brackets 48 and 49 so that the rods will travel therewith. The springs 52 and 53 are compressively held between the rear brackets 48 and 49 and the forward brackets 54 and 55. Thus, as the piston rod 30 is pulled forwardly within the cylinder 29, these springs 52 and 53 are compressed to yieldingly resist that travel.

Operation

When the cross bars 24 are to be carried rearwardly across the platform 10 in the unloading operation, the valve 35 is manipulated to set up pressure through the hose line 34 in the rear end of the cylinder 29 so as to pull the piston rod 30 forwardly, the initial position of the cross bar 38 being as indicated in all of the views in the drawings. As the piston rod 30 starts forwardly, the hooks 44 drop through links 43 of the respective chains 11 and 12, and thus engage those chains and continued forward travel of the piston rod 30 pulls those chains along so as to pull the cross bars 24 resting on the platform 10 rearwardly thereof. This pull is continued until the end of the permissible travel of the piston rod 30, whereupon the valve 35 is manipulated either automatically in timed sequence with the travel of the chains, or manually to cut off the flow of the pressurizing fluid from the supply line 36 to open the line 34 through the discharge line 37, whereupon the springs 52 and 53 will return the piston rod 30 to its rearmost position of travel thereby carrying the members 39 and 40 rearwardly to ride over the top sides of the under chain flights 11a and 12a without engagement therewith. The members 39 and 40 together with the attaching framework of the members 38, 41 and 42, plus the plates 46, 47 and the rods and springs carried thereby have sufficient weight to keep the members 39 and 40 in riding contact with those chain flights 11a and 12a in that rearward travel thereover. Thus the members 39 and 40 are always in contact with those chain flights ready to engage with the links under the hooks 44 upon the return, forward travel of the piston rod 30.

Thus the drag bars 24 are intermittently moved across the platform 10 from a forward zone thereof to a rearward zone to be carried around thereunder and brought back again over the forward zone. The material on the platform 10 is thus dumped from the rear, right hand portion as viewed from the drawings.

The drawings and the description thereof have been in connection with a single acting cylinder 29. Obviously a double acting hydraulic cylinder may be employed to set up a power action for both directions of travel of the piston rod 30. In the use of the double acting cylinder, the side springs 52 and 53 could be omitted. However, the invention is shown and described in the simple form of the single acting hydraulic cylinder, since that is in most use on farms today.

While we have herein shown and described our invention in the one particular and most simplified form now known to us, it is obvious that structural changes may be employed without departing from the spirit of the invention, and we therefore do not desire to be limited to that precise form beyond the limitations which may be imposed by the following claims.

We claim:

1. A material unloading device comprising a floor upon which the material may rest; a link chain extending along the floor in the direction the material is to move in unloading from the floor; a drag bar carried by the chain to drag over the floor; said chain having a return flight carried back in the opposite direction below the floor level; a motor suspended under the floor; a member driven by the motor to extend therefrom; a chain engaging member freely resting an and ridable along and over said chain flight; said motor driven member being interconnected to said engaging member; a hook carried at the rear end portion of said engaging member turned downwardly and forwardly from the engaging member to engage a chain link on forward travel of the member; said hook having an under surface back of said hook sloping upwardly and rearwardly to ride over said chain links to disengage said hook from link engagement upon rearward travel of the engaging member; means returning said engaging member to a rear position following travel to a forward position; and means intermittently actuating said motor.

2. The structure of claim 1 wherein said return means comprises a spring interconnected to said engaging member compressed during said engaging member rearward travel.

3. The structure of claim 1 wherein said engaging member supports said driven member and rides over said chain flight in contact therewith under the influence of gravity.

4. In an unloading device, a floor; a chain on opposite sides of the floor; drag bars extending across the floor and interconnected by their ends to said chains; means adjacent the rear end of said floor around which said chains are wrapped; a chain return flight extending respectively from under said means at a level below said floor; a hydraulic cylinder rockably fixed by its forward end adjacent the under side of the floor at a distance forwardly of said floor rear end; a transverse cross bar; a runner fixed to opposite end portions of said cross bar; said runners being spaced apart one each to ride on the top side of the respective chain return flights; means supporting said flights from their under sides; said runners having lengths to extend along a plurality of end-to-end connected links; a hook extending downwardly from a rearward end portion of each of said runners and sized to drop into engagement with a chain link thereunder upon initial forward travel of the runners; a piston rod extending from said cylinder interconnecting with said cross bar; and valve controlled means for selectively pressurizing said cylinder to set up forward travel of said rod to pull said chain flights forwardly.

5. The structure of claim 4 wherein said cylinder and rod extend normally diagonally downwardly and rearwardly until said hooks engage said links and start pulling said flights forwardly whereupon said flights are lifted from said chain wrapped means under pull tending to reduce the angle between said rod and said floor.

6. In an unloading device, a floor; a chain on opposite sides of the floor; drag bars extending across the floor and interconnected by their ends to said chains; laterally spaced sprockets adjacent the rear end of said floor around which said chains are wrapped; a chain return flight extending respectively from under each of said sprockets at a level below said floor; a hydraulic cylinder rockably fixed by its forward end adjacent the under side of the floor at a distance forwardly of said floor rear end; a transverse cross bar; a runner fixed to opposite end portions of said cross bar; said runners being spaced apart one each to ride on the top side of the respective chain return flights; means supporting said flights from their under sides; said runners having lengths to extend along a plurality of end-to-end connected links; a hook extending downwardly from a rearward end portion of each of said runners sized to drop into engagement with a chain link thereunder upon initial forward travel of the runners; a piston rod extending from said cylinder interconnecting with said cross bar; and valve controlled means for selectively pressurizing said cylinder to set up forward travel of said rod to pull said chain flights forwardly; and a nose on the rear end of each of said runners, having an under, upwardly and rearwardly inclined surface extending from said hook; an abutment fixed adjacent each of said chain flights forwardly of said sprockets; a rod fixedly carried by each of said runners to extend forwardly slidably through said abutments; and a compressible, return spring surrounding each of said rods between said abutments and the rod interconnections with said runners.

7. In an unloading device, a floor; a chain on opposite sides of the floor; drag bars extending across the floor and interconnected by their ends to said chains; laterally spaced sprockets adjacent the rear end of said floor around which said chains are wrapped; a chain return flight extending respectively from under each of said sprockets at a level below said floor; a hydraulic cylinder rockably fixed by its forward end adjacent the under side of the floor at a distance forwardly of said floor rear end; a transverse cross bar; a runner fixed to opposite end portions of said cross bar; said runners being spaced apart one each to ride on the top side of the respective chain return flights; means supporting said flights from their under sides; said runners having lengths to extend along a plurality of end-to-end connected links; a hook extending downwardly from a rearward end portion of each of said runners sized to drop into engagement with a chain link thereunder upon initial forward travel of the runners; a piston rod extending from said cylinder interconnecting with said cross bar; and valve controlled means for selectively pressurizing said cylinder to set up forward travel of said rod to pull said chain flights forwardly; sprockets mounted adjacent the forward end of said floor, around which forward sprockets said chain flights are carried back onto said floor, said chains being endless.

8. A device for intermittently driving a chain conveyor having advancing upper and returning lower chain flights, comprising a reciprocable drive member rockably mounted between the levels of the two chain flights to have an end portion normally dropping freely downwardly toward the oncoming lower flight; a member interconnected with said drive member and freely resting on and riding over the lower flight chain; a hook member extending downwardly from said free riding member engageable within openings of the links of said chain, said engageable member being spaced on said riding member a distance from its end remote from said member connection; said return flight being free to be lifted into a plane approximately including said reciprocable member upon travel of the reciprocable member to effect returning travel of said lower flight.

References Cited in the file of this patent

UNITED STATES PATENTS

| 1,513,628 | Risser | Oct. 28, 1924 |
| 1,522,116 | Gray et al. | Jan. 6, 1925 |
| 1,934,835 | Weiss | Nov. 14, 1933 |
| 2,598,931 | Narsted | June 3, 1952 |